(12) United States Patent
Fleck (10) Patent No.: US 8,860,248 B2
(45) Date of Patent: Oct. 14, 2014

(54) UNDER FREQUENCY/UNDER VOLTAGE DETECTION IN A DEMAND RESPONSE UNIT

(75) Inventor: Christopher K. Fleck, St. Louis, MO (US)

(73) Assignee: Aclara Technologies LLC, St. Louis, MO (US)

( * ) Notice: Subject to any disclaimer, the term of this patent is extended or adjusted under 35 U.S.C. 154(b) by 1239 days.

(21) Appl. No.: 12/731,825

(22) Filed: Mar. 25, 2010

(65) Prior Publication Data

US 2010/0244563 A1 Sep. 30, 2010

Related U.S. Application Data

(60) Provisional application No. 61/164,049, filed on Mar. 27, 2009.

(51) Int. Cl.
*H02J 3/14* (2006.01)

(52) U.S. Cl.
CPC *H02J 3/14* (2013.01); *Y04S 20/222* (2013.01); *Y02B 70/3225* (2013.01)
USPC ............... 307/35; 307/66; 307/127; 307/141; 307/29; 307/52; 702/60; 702/62; 700/295; 700/191; 700/286; 700/296; 703/13; 703/18; 330/10

(58) Field of Classification Search
CPC ................. H02J 1/00; H02J 3/00; H02J 4/00; H02J 5/00; H02J 3/14; H02J 3/38
USPC ............. 307/35, 38, 34, 39, 41, 62, 125, 126, 307/29, 129, 127, 66; 327/141; 330/10; 700/295, 286, 296, 294
See application file for complete search history.

(56) References Cited

U.S. PATENT DOCUMENTS

| | | | |
|---|---|---|---|
| 4,090,088 A * | 5/1978 | McMahon et al. ............... | 307/38 |
| 4,090,090 A | 5/1978 | Johnston | |
| 4,096,395 A | 6/1978 | Bogel et al. | |
| 4,177,388 A | 12/1979 | Lingenfelter | |
| 4,281,386 A | 7/1981 | Kondow et al. | |
| 4,547,726 A | 10/1985 | Premerlani | |
| 4,612,617 A | 9/1986 | Laplace, Jr. et al. | |

(Continued)

*Primary Examiner* — Rexford Barnie
*Assistant Examiner* — Jagdeep Dhillon
(74) *Attorney, Agent, or Firm* — Polster, Lieder, Woodruff & Lucchesi, L.C.

(57) ABSTRACT

A demand response unit (DRU) interposed between a utility's electrical power line (PL) and at least one load (L1-Ln) to which power is supplied by the utility over the line. A detector (Fdet or Vdet) measures a characteristic (frequency F, voltage V) of an electrical waveform (W) by which power is transmitted by the utility to the load. The detector determines both when the measured frequency or voltage exceeds a predetermined threshold for a first predetermined period of time; and, if the threshold is exceeded, when the frequency or voltage exceeds the second predetermined threshold for a second predetermined period of time. For this purpose, the detector processes a predetermined number of intervals of the waveform and produces an average value of the characteristic which is compared to the threshold. This is done to reduce the effect of extraneous events which may temporarily change the value of the frequency or voltage. A power control (PC) is responsive to an output from the detector to, at least, partially interrupt flow of power to the load during the period of time when the measured frequency or voltage exceeds the threshold, thereby to reduce the load on the utility.

29 Claims, 3 Drawing Sheets (56) References Cited

U.S. PATENT DOCUMENTS

| | | |
|---|---|---|
| 4,638,175 A | 1/1987 | Bradford et al. |
| 4,731,690 A | 3/1988 | Beg et al. |
| 4,785,195 A | 11/1988 | Rochelle et al. |
| 4,788,647 A | 11/1988 | McManus et al. |
| 4,890,002 A | 12/1989 | Schornack |
| 4,996,646 A | 2/1991 | Farrington |
| 5,166,887 A | 11/1992 | Farrington et al. |
| 5,170,360 A | 12/1992 | Porter et al. |
| 5,181,026 A | 1/1993 | Granville |
| 5,185,705 A | 2/1993 | Farrington |
| 5,390,068 A | 2/1995 | Schultz et al. |
| 6,347,028 B1 | 2/2002 | Hausman, Jr. et al. |
| 7,149,605 B2 * | 12/2006 | Chassin et al. ................ 700/295 |
| 7,274,111 B2 | 9/2007 | Andrew et al. |
| 7,355,301 B2 | 4/2008 | Ockert |
| 7,356,422 B2 | 4/2008 | Schweitzer et al. |
| 7,427,815 B1 * | 9/2008 | Ye et al. ....................... 307/127 |
| 7,469,190 B2 | 12/2008 | Bickel |
| 7,595,567 B1 * | 9/2009 | Cannon et al. ................. 307/29 |
| 7,692,329 B2 * | 4/2010 | Abu Qahouq et al. .......... 307/14 |
| 7,778,738 B2 * | 8/2010 | Taft ............................... 700/295 |
| 2007/0208981 A1 | 9/2007 | Restrepo et al. |
| 2007/0279127 A1 * | 12/2007 | Lee ................................ 330/10 |
| 2010/0169031 A1 * | 7/2010 | Dishman et al. ............... 702/60 |

* cited by examiner

UNDER FREQUENCY/UNDER VOLTAGE DETECTION IN A DEMAND RESPONSE UNIT

CROSS-REFERENCE TO RELATED APPLICATIONS

U.S. provisional application 61/164,049 filed Mar. 27, 2009.

STATEMENT REGARDING FEDERALLY SPONSORED RESEARCH

Not Applicable.

BACKGROUND OF THE INVENTION

This invention relates to load control or demand response by a utility; and more particularly to apparatus and a method for detecting an under-frequency or under-voltage condition on the utility's power distribution system which indicates need for load control. An over value detection capability is also provided in accordance with the method.

An electrical utility supplies power to a variety of customers over a wide geographic area. The power commonly supplied by the utility is three-phase (3φ), 60 cycle (Hz), 120 volt (VAC.) power. Under normal operating conditions, the power supplied is uniform throughout the system. At these times, the system effectively distributes power to a wide range of electrical loads all of which can operate at 100% of their capabilities.

Sometimes, however, circumstances occur in which excessive load on the system impacts the quality of electrical service provided by the utility. An exemplary cause of this is high heat and high humidity which occurs during summer months and during which times electrical equipment such as air conditioners and dehumidifiers are constantly running. The effect created during these peak times of electrical usage manifest themselves by the line frequency and/or line voltage falling below the normal levels noted above. When this happens, unless the utility can control consumption (i.e., shed load), blackouts or brownouts may occur.

It is known in the art to connect power management devices, commonly referred to as load control or demand response units (LCUs or DRUs) to appliances or other electrical loads at a customer's location. See, for example, U.S. Pat. No. 7,355,301 (the '301 patent), U.S. Pat. No. 7,242,114 (the '114 patent), U.S. Pat. No. 7,149,605 (the '605 patent) and U.S. Pat. No. 7,010,363, and published U.S. patent application 2006/0229768. The device may be connected to a single load, or it may be connected to a number of loads.

As described in the '301 patent, a primary voltage source is sampled at regular intervals. The resulting voltage readings are then compared to voltage readings representing an under-frequency or under-voltage threshold. When an under-frequency or under-voltage condition is detected, an in-response cycle is commenced during which the electrical load imposed on the system is controlled. When the readings fall below a "fail" level, load restore counter values are stored in a memory before load is shed. A restore load response is initiated when the voltage reading values rise above a "restore" level and remain above that level for a period of time.

As taught in the '605 patent, for example, a power management device includes control circuitry that monitors received electrical energy (AC line waveform) and controls operations of loads so to maintain operation of a utility's power distribution system within a desired range. This includes adjusting the amount of electrical energy supplied to respective loads. In this regard, control circuitry transmits a control signal to a controller for a respective load, with the control signal causing the load on the system to be reduced. Alternatively, the control circuitry operates a control relay to adjust the amount of electrical energy applied to the load. The control circuitry can completely shut down a load.

Incumbent upon the operation of any load control device is the ability to first detect the occurrence of an under-voltage or under-frequency condition so demand control protocols can be implemented; and second, to determine when the voltage or frequency has returned to within their normal range so load control can be terminated. In the power management device described in the '605 patent, a step-down transformer reduces line voltage to an AC voltage of significantly less peak amplitude and the AC voltage waveform is converted to a square wave. A voltage clipping circuit processes the waveform to produce a pulse waveform whose leading (rising) edge represents a positive zero-crossing and whose trailing (falling) edge represents a negative zero-crossing. For monitoring line frequency, a reference clock signal is supplied to a control circuit which counts the number of clock signal pulses between (successive) rising edges of the pulse waveform. The resulting count represents the line frequency of electrical energy transmitted by the utility. The control circuit accesses a count value representing a load shed threshold and compares the number of counted clock pulses to the threshold value. If the threshold value is exceeded, load shedding is commenced and continues until the count value representing line frequency is again less than the threshold value.

A different process is described in the '114 patent in which clock pulses are again counted to determine line frequency with a counter being incremented or decremented in response to a count value. As described in the '114 patent, when line frequency is 60 Hz, a count value is initialized to zero. If the line frequency then falls below a preset frequency value, the counter starts counting up. If the line frequency then climbs back above the threshold, the counter starts counting back down to zero. However, if the count value exceeds an under-frequency count value, a line under frequency (LUF) condition is considered to have been detected. This condition remains in effect until a restore condition is satisfied based upon the count value again going to zero.

In both the '605 and '114 patents, the method of determining an under-voltage condition is similar to that outlined above with respect to determining an under-frequency condition. While the methods described in these patents may be effective for their intended purposes, another, simpler to implement method has been developed which accurately determines when an under-frequency or under-voltage condition exists, for providing load control throughout the duration of the situation, and for accurately determining when the condition is over and load control is no longer necessary.

BRIEF SUMMARY OF THE INVENTION

The present disclosure is directed to a demand response unit or DRU connected between a power line over which a utility transmits electrical energy and one or more loads which consume the energy. The DRU is designed to provide the utility with an intelligent load shedding capability that is unobtrusive to a utility's customer and is independent of the customer's electric metering device. The autonomous load control provided by the DRU allows increasing load demand to be recognized and acted upon without requiring human intervention.

A method of over/under detection of the value of an electrical waveform's characteristic is also disclosed. Further, over/under value detection, in accordance with the method of the invention, as well as any resultant load control or other action resulting therefrom, while implemented by the DRU, can be implemented using other platforms as well.

The method and apparatus of the invention provides the capability to detect under-voltage and under-frequency conditions, with the monitoring of these conditions triggering load control based upon utility configurable settings. A plurality of set points are established for both under-voltage and under-frequency conditions. Each set point includes parameters that determine how the DRU operates for a particular under-frequency or under-voltage occurrence. Each set point contains values for a trip threshold, trip duration, a clear threshold, and a clear duration; together with a list of actions based upon the event which occurs. A set point is considered "tripped" when the average period (frequency) of the line voltage remains below the established frequency trip threshold for the specified trip duration, or the line voltage remains below the established voltage trip threshold for the specified trip duration. The respective frequency or voltage set point is considered cleared when the frequency or voltage subsequently goes above, and remains above, the specified clear threshold for the clear duration.

The DRU can implement a different action at each set point with each set point further defining what action is to be taken when the respective set point is tripped. These actions include, without limitation, taking no action at all, activating an alarm, incrementing an under-frequency or under-voltage counter, and shedding load. Any of the latter three actions can be taken singly, or in combination with other of the actions. If load is to be shed, the set point includes parameters dictating both how load is to be shed, and to which control ports load shed is applied.

In accordance with the method of the invention, a set point is established for both line frequency and line voltage. These set points each comprise a trip threshold, trip duration, clear threshold and clear duration. Each threshold has an associated, pre-established duration value which determines how long an observed value (frequency or voltage) must remain above or below the appropriate threshold before an action is taken. Several measurements (samples) of a value are made during each period (interval) of a waveform, with the results being averaged. This is done to reduce the effects of false alarms or spurious events.

The DRU has a direct load control capability by which a utility can send a load control command to the DRU for execution. It further has an autonomous load control capability by which the DRU can itself initiate a load control protocol based upon rules established by the utility. The DRU also has a load pickup capability which protects the utility from high inrush currents that may occur during recovery from outages by randomly bringing loads back on-line so that the aggregate loading experienced by the utility is reduced to a level which precludes the immediate occurrence of a new load control event.

The DRU is easy to install and program and can be communicated with in different ways including use of a two-way automatic communications system (TWACS®). Again, the method of over/under value detection described herein, and any resultant actions, can be implemented with the DRU as well as with other platforms.

BRIEF DESCRIPTION OF THE SEVERAL VIEWS OF THE DRAWINGS

The objects of the invention are achieved as set forth in the illustrative embodiments shown in the drawings which form a part of the specification.

Corresponding reference characters indicate corresponding parts throughout the several

DESCRIPTION OF THE PREFERRED EMBODIMENT

The following detailed description illustrates the invention by way of example and not by way of limitation. This description clearly enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

The following description is primarily directed at under frequency and under voltage detection in a power distribution system, and resulting load control and load restoration activities. However, those skilled in the art will appreciate that using the method of the invention, over value detection of a waveform characteristic is also accomplished without departing from the scope of the invention.

Figure 1A:
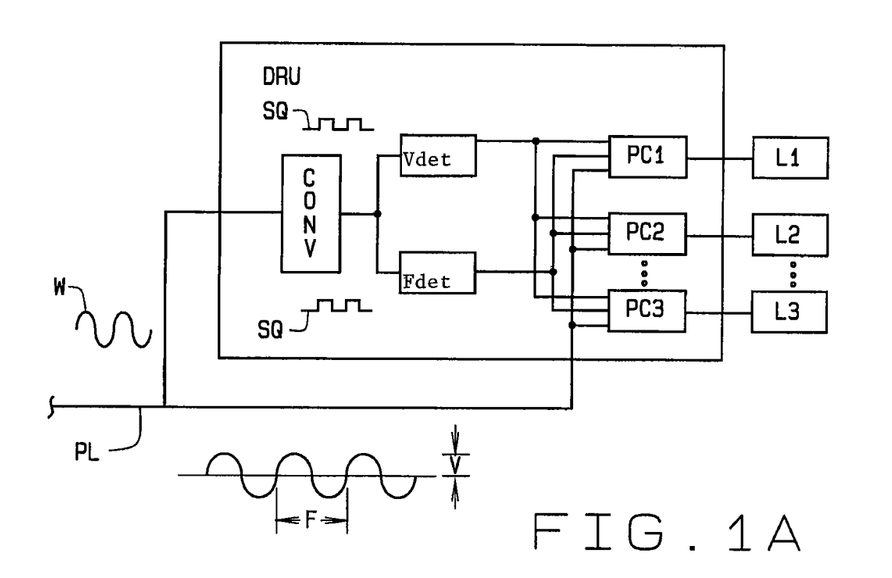
FIG. 1A illustrates one installation of a demand response unit (DRU) of the present invention with a utility power line and one or more loads drawing power from the utility.

Referring to the drawings, a demand response unit DRU of the present invention is interposed between a utility's electrical power line PL and at least one controlled load L1-Ln to which power is supplied by the utility over the power line. As shown in FIG. 1A, the DRU can be used with a plurality of controlled loads, each of which can be separately controlled, as described hereinafter, when a load control event occurs. As noted above, during normal conditions, each controlled load can operate at up to 100% of its rated capacity when in operation. However, during peak times of electrical usage, the effect of the overall load imposed on the utility can manifest itself by the frequency F and/or line voltage V of the electrical waveform W transmitted over power line PL falling below their normal levels. When these conditions occur, unless the utility can control energy consumption (i.e., shed load), a blackout or brownout may result.

Figure 1B:
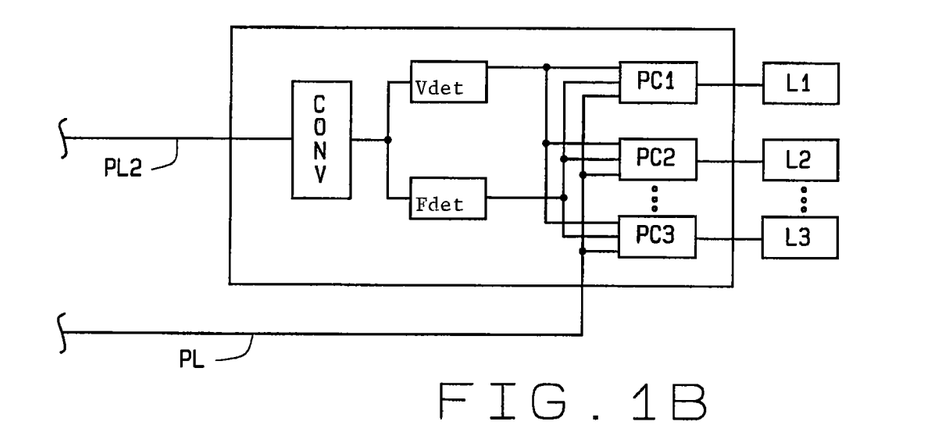
FIG. 1B illustrates a second installation of the DRU.

Referring to FIG. 1B, a different installation of the DRU is shown. In this second installation, the power line PL by which power is supplied from the utility to the load(s) is not the same power line which is sampled by the DRU to detect an under-frequency or under-voltage condition. Rather, the DRU is powered from a second power line PL2, and the voltage and frequency on this second power line are what is sampled by the DRU to determine if an "under" condition exists. If one does, the DRU still acts to control flow of power over the first power line PL which supplies the load.

Figure 2:
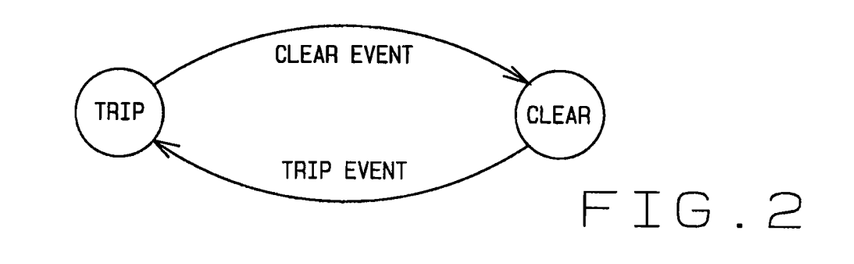
FIG. 2 is a flow chart depicting operation of a DRU to control load with respect to the under/over value detection.

The operating cycle of the DRU is shown in FIG. 2. Under normal circumstances, the DRU is operating in a "clear" condition, meaning that the frequency or voltage of the electrical waveform is within an acceptable range of values. However, during a peak load situation, if the frequency or voltage of the electrical waveform falls below a predetermined threshold level, and remains there for a first predetermined period of time, a "trip" event occurs. Now, each controlled load is subject to having its duty cycle reduced from 100% to some lesser duty cycle, or shut-off altogether. The extent to which the duty cycle is reduced is based upon a number of factors. One is the type of controlled load. Another is the circumstances under which the load is operated. Thus, for example, during times of high heat, it is probably more important for an air conditioner to operate nearer to its full duty cycle than a washing machine or clothes dryer (either of which may not need to operate at all). Further, an air conditioner in a residence may not need to operate as much as one in a nursing home or hospital.

Once the "trip" event occurs, the DRU remains in its "trip" state until the frequency or voltage of the electrical waveform not only again exceeds the predetermined threshold, but does so for a second predetermined period of time. When this time limit is exceeded, a "clear" event is created. Now, the DRU restores the controlled loads back to their 100% duty cycle, doing so in a controlled manner that does not abruptly add so much load back onto the utility's power grid that a new "trip" event is created.

As shown in FIGS. 1A and 1B, electrical waveform W supplied over power line PL to the loads is routed to the loads through a power controller PC1-PCn. There is a separate power controller or power control module for each controlled load. Each power controller is separately programmable for the load to which it is connected. Thus, when a load control event occurs, each controlled load can be separately controlled. So, one controlled load (e.g., load L1) may operate at a 90% duty cycle during the event, a second controlled load (e.g., load L2) may operate at a 75% duty cycle, while a third controlled load (e.g., load Ln) may operate at a 50% duty cycle or be shut-off altogether for the duration of the event. Other operational characteristics of the power controllers are described hereinafter. Those skilled in the art will appreciate that: i) each load controller may comprise a separate module within an overload control device or apparatus; and ii) that each controller comprises both hardware and software to implement the load control function.

The DRU includes one and preferably two detectors for measuring a characteristic of waveform W by which power is transmitted by the utility to the loads. The two waveform characteristics measured by the DRU are voltage and frequency with a detector Vdet detecting a line under-voltage or LUV condition; and with a detector Fdet detecting a line under-frequency or LUF condition. Both detector Vdet and detector Fdet operate in the same manner. Those skilled in the art will understand that a number of characteristics associated with waveform W can be measured and used for load control purposes. For example, the voltage used can be peak voltage or root mean square (rms) voltage. Or, power factor (pf) can be used as a measure.

Each detector measures a characteristic (frequency, voltage, etc.) of waveform W. The detector determines both when the measured frequency or voltage exceeds a predetermined threshold for a first predetermined period of time; and, if the threshold is exceeded, when the frequency or voltage no longer exceeds a second threshold for a second predetermined period of time. In this regard, the threshold frequency is a frequency slightly less than the nominal frequency (e.g. 60 Hz in come countries, 50 Hz in other countries), and the threshold voltage is a value slightly less than the nominal line voltage of the waveform. Further, the first predetermined period of time and the second predetermined period of time are not necessarily equal. As a practical matter, one interval may be purposely made longer than the other to insure proper and reliable operation of the DRU.

Figure 3:
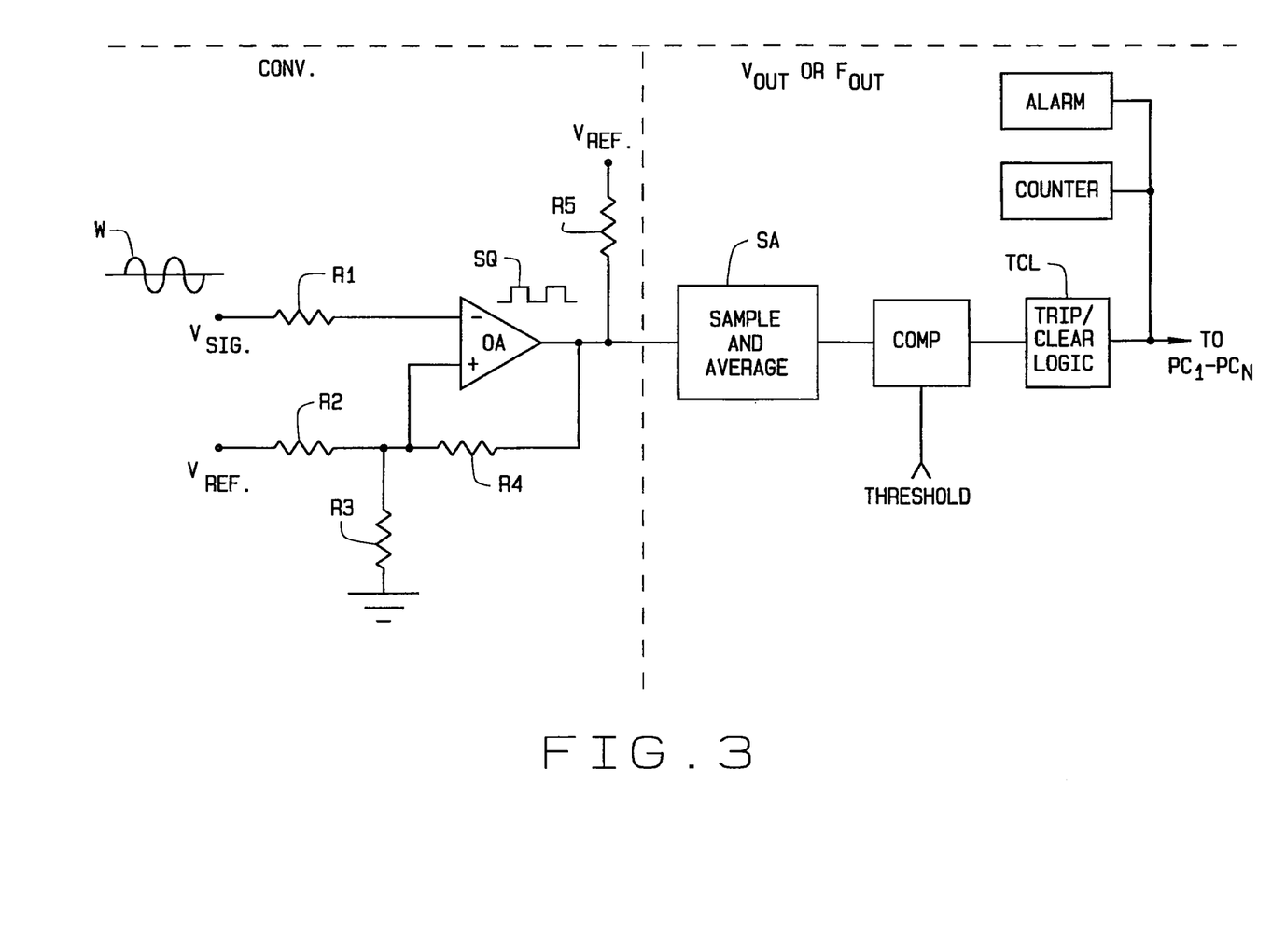
FIG. 3 is a schematic of circuitry used for under-frequency and under-voltage detection by the DRU; and, FIG. 4 is a simplified representation depicting the occurrence of an under-frequency or under-voltage event both as to the "tripping" of the event and its subsequent "clearance" or termination.

A waveform converter CONV is responsive to waveform W to convert the waveform from a sinusoidal waveform to a square wave SQ which is provided as an input to each of the detectors, for reducing the line voltage to a voltage signal readily processed by converter CONV. For this purpose, converter CONV includes a step-down transformer (not shown). Alternately, converter CONV converts the sinusoidal waveform to a sawtooth waveform or other type of waveform. Referring to FIG. 3, a waveform W of the converted line voltage waveform is applied from node Vsig to one input of an operational amplifier OA through a resistor R1. The other input to the amplifier is a voltage Vref, which ranges between +5VDC and −5VDC. This voltage is applied to the other input of the operational amplifier through a voltage divider comprising resistors R2 and R3. The output of the operational amplifier is fed back to this other input of the operational amplifier through a resistor R4. The resulting output of operational amplifier OA is the square wave SQ whose period is the same as that of waveform W at node Vsig.

From converter CONV, square wave SQ is applied as an input to a sampling and averaging module SA of the respective detector Vdet or Fdet. Module SA comprises firmware which processes a predetermined number of intervals of square wave SQ and produces an average value for the voltage or frequency represented by the square wave. With respect to frequency, for example, the time period between the occurrence of the rising (leading) edge of each successive wave and that of the preceding wave is measured. Over time, an N number of samples is collected. For each cycle of the line voltage waveform, these values are summed and the result is divided by N to produce an average value of the time period. For example, each period of square wave SQ is sampled 32 times and the values averaged to produce the value compared against the threshold. This average is a sliding average. That is, when each calculation is performed, the oldest sample value is dropped from the calculation, and the newest sample value is included in it. The calculated average period value is now compared against a predetermined value (set point) to determine if the calculated average is above or below the threshold.

The sampling and averaging operation is done to reduce the effect of extraneous events which may temporarily change the voltage or frequency of the electrical waveform supplied by the utility, but which change is not caused by an overload condition. The output value from this sampling and averaging operation is supplied as an input to a comparator COMP which compares the value against the predetermined threshold value.

Figure 4:
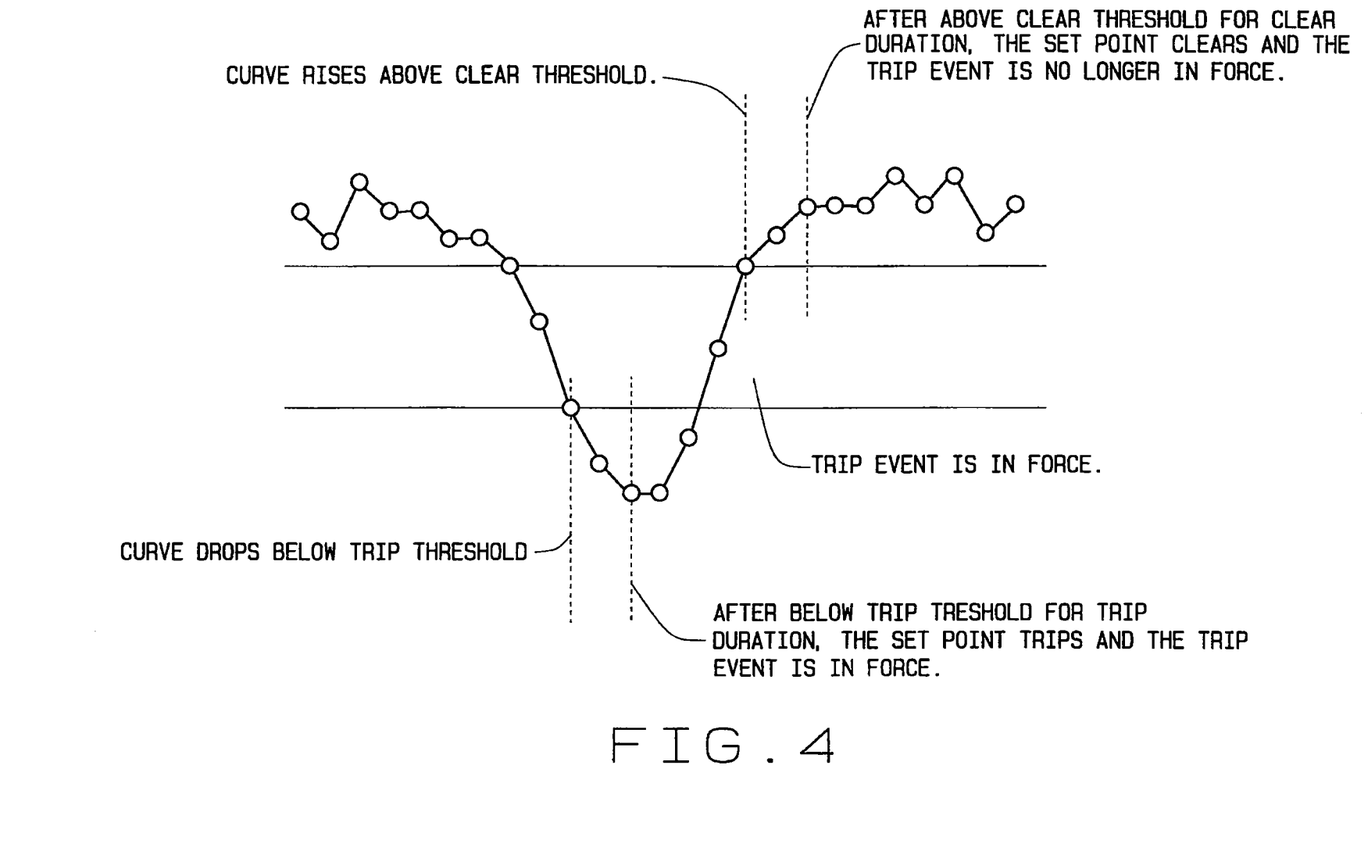

Referring to FIG. 4, respective set points are established for both under-voltage and under-frequency conditions. Each set point includes parameters which then determine how the DRU will operate for a particular under-frequency or under-voltage occurrence. For example, each set point contains values for a trip threshold, a trip duration, a clear threshold, and a clear duration, together with a list of actions based upon the event which occurs. A set point is considered "tripped" when the average period (frequency) of the line voltage remains below the established frequency trip threshold for the specified trip duration, or the line voltage (peak or rms) remains below the established voltage trip threshold for the specified trip duration. The respective frequency or voltage set point is then considered cleared when the frequency or voltage subsequently goes above, and remains above, the specified clear threshold for the clear duration.

Those skilled in the art will understand that the DRU can implement a different action at each set point. Each set point further defines what action, if any, is to be taken when the respective set point is tripped. That is, if an under-frequency or under-voltage condition occurs, the DRU can be programmed to take no action at all. More practically, these actions include, for example, i) activating (setting off) an alarm, ii) incrementing an under-frequency or under-voltage counter, and iii) shedding load. It will be further understood by those skilled in the art that any of these actions may occur singly, or in combination with other of the actions. Thus, as shown in FIG. 3, the output from the trip/clear logic TCL of the DRU is supplied to both a counter and an alarm as well as to the power controllers.

With respect to load shedding, if load is to be shed, the set point includes parameters which dictate both how load is to be shed, and to which control ports load shed is applied. Each set point has at least two modes of operation associated with it based upon values specified for the trip threshold and clear threshold, providing under and over value detection. Further, each threshold (trip and clear) has an associated duration value. For a trip event to occur, for example, the observed line frequency value must remain continuously below the trip threshold for the specified duration. Once that happens, a "trip event" is declared by the control method implemented by the DRU. A trip event occurs at one moment in time. Thereafter, so long as the line frequency remains below the clear threshold, the method implemented by the DRU implements its "trip in force" event protocol. This continues until it is removed which occurs when the frequency value rises above the clear threshold and remains there for the specified duration. At that time, a "clear event" is declared and the trip in force condition is removed.

In addition, when a trip event occurs, the DRU also has an autonomous load control capability by which the DRU can itself initiate a load control protocol based upon rules established by the utility. Load control in accordance with either of these methods is accomplished using the respective power controllers PC1-PCn.

Determination of whether or not load is to be shed by a particular appliance controlled by the DRU, how much load, and when, is determined by the set point configuration programmed into the DRU. In this regard, a load profile for the appliances provides a baseline amount of load from which load is shed. It will be understood by those skilled in the art that some appliances can be readily shut-off altogether, some appliances can be operated at a percentage of their full load capability, that other appliances must be operated at, at least, some minimum percentage of their full capability, and that the overall reduction in load necessitated by the event can be readily maintained even though there is switching between loads so that some loads are off (or at a reduced level of operation) at one point in time, and others are at other points in time.

The DRU also has a load pickup capability which is implemented at the end of an outage event. This capability is important in that it protects the utility from high inrush currents that may occur during the recovery from an outage by randomly bringing loads back on-line. By bringing loads back on-line in this manner, the aggregate loading experienced by the utility is reduced to a level which precludes the immediate occurrence of a new load control event. Again, this protocol is also implemented using the power controllers PC1-PCn.

Finally, those skilled in the art will understand that over value detection of a waveform characteristic (voltage, frequency, other) is accomplished in the same manner as under value detection. The difference is that the respective thresholds are now reversed. That is, for example, when the clear threshold is less than the trip threshold, an over value capability now exists.

In view of the above, it will be seen that the several objects and advantages of the present disclosure have been achieved and other advantageous results have been obtained.

Having thus described the invention, what is claimed and desired to be secured by Letters Patent is:

1. A demand response unit (DRU) interposed between a utility's electrical power line and at least one load to which power is supplied by the utility over the line, comprising:
    at least one detector measuring a characteristic of an electrical waveform by which power is transmitted by the utility to the load, the detector determining when a value of the measured characteristic exceeds a predetermined threshold for a first predetermined period of time, and if the threshold is exceeded, when the measured value exceeds a second predetermined threshold for a second predetermined period of time, and the detector processing a predetermined number of samples acquired during each cycle of the waveform to produce an average value of the characteristic which is compared to the threshold thereby to reduce the effect of extraneous events which may temporarily change the value of the measured characteristic, successive samples acquired for processing not being acquired at the same phase location on the cycle of the waveform during which they are acquired; and,
    power control means responsive to an output from the detector to at least partially interrupt flow of power to the load during the period of time when the measured value exceeds the predetermined threshold thereby to reduce the load on the utility.

2. The DRU of claim 1 in which the power control means stops interrupting the flow of power to the load when the value of the measured characteristic exceeds the second predetermined threshold for a second predetermined period of time.

3. The DRU of claim 2 which is interposed between the power line and a plurality of loads supplied power by the utility, the power control means interrupting flow of power to each of the loads during the period of time when the measured value exceeds the predetermined threshold, the interruption of power to each load being based upon a predetermined set of criteria unique to that load whereby the amount of time power is interrupted to one load during the period of time when the measured value exceeds the limit may differ from the amount of time power is interrupted to another load during this period.

4. The DRU of claim 1 further including a counter whose count value is incremented each time the measured value exceeds the predetermined threshold for the first predetermined period of time.

5. The DRU of claim 4 further including an alarm which is activated each time the measured value exceeds the predetermined threshold for the first predetermined period of time.

6. The DRU of claim 5 in which the counter is incremented or the alarm activated instead of the power control means interrupting flow of power to a load.

7. The DRU of claim 3 further including a second detector measuring a second characteristic of the electrical waveform, the second detector determining when a value of the second characteristic exceeds a predetermined threshold for a first predetermined period of time, and if the threshold is exceeded, when the measured value exceeds the second predetermined threshold for a second predetermined period of time, the detector processing a predetermined number of intervals of the waveform and producing an average value of the second characteristic which is compared to the threshold thereby to reduce the effect of extraneous events which may temporarily change the value of the measured characteristic; and, the power control means being further responsive to an output from the second detector to at least partially interrupt flow of power to a load during the period of time when the measured value exceeds the limit thereby to reduce the load on the utility.

8. The DRU of claim 7 in which one of the measured characteristics is the line frequency of the waveform, and the other characteristic is the waveform voltage.

9. The DRU of claim 8 further including a converter for converting the waveform into a signal supplied to an input of each detector, with a characteristic of the signal corresponding to the frequency or voltage of the waveform.

10. The DRU of claim 1 in which power to the loads is supplied by a first power line from the utility in which the DRU is interposed, and the DRU is further connected to a second and separate power line, the waveform processed by the DRU being that of the electrical waveform by which power is transmitted by the utility over the second power line.

11. The DRU of claim 9 in which the converter has as an input the electrical waveform transmitted by the utility, the converter converting the waveform, which is a generally sinusoidal waveform, into a different, converted waveform which is supplied as an input to each detector.

12. The DRU of claim 11 in which the converted waveform comprises a generally square waveform.

13. The DRU of claim 11 in which the converted waveform comprises a generally sawtooth waveform.

14. The DRU of claim 9 in which the measured voltage characteristic is a function of the peak amplitude of the waveform voltage.

15. The DRU of claim 9 in which the measured voltage characteristic is a function of the root mean square (rms) amplitude of the waveform voltage.

16. The DRU of claim 9 in which each detector compares a resultant value obtained by sampling the converted waveform against a value representing the predetermined threshold of the respective measured characteristic to determine if the threshold for that measured characteristic has been exceeded.

17. The DRU of claim 10 in which each detector performs the comparison for each interval of the electrical waveform and provides an output to the power control means once the threshold has been exceeded the first predetermined period of time.

18. A method of performing demand response to control the load imposed on an electrical utility during the occurrence of selected events, comprising:

measuring a characteristic of an electrical waveform by which power is transmitted by the utility to an electrical load, said measuring including:

acquiring and processing a predetermined number of samples taken during each cycle of the waveform, successive samples acquired for processing not being acquired at the same phase location on the cycle of the waveform during which they are acquired:

producing an average value of the characteristic based upon the samples;

comparing the average value to a predetermined threshold; and, determining when the average value of the measured characteristic exceeds the threshold for a first predetermined period of time, and if the threshold is exceeded, when the measured value exceeds the second predetermined threshold for a second predetermined period of time, whereby processing the predetermined number of waveform intervals to produce the average value of the characteristic reduces the effect of extraneous events which may temporarily change the value of the measured characteristic; and, at least partially interrupting flow of power to the load during the period of time when the measured value exceeds the predetermined threshold thereby to reduce the load on the utility.

19. The method of claim 18 in which flow of power to the load ceases being interrupted when the value of the measured characteristic exceeds the second predetermined threshold for the second predetermined period of time.

20. The method of claim 18 further including measuring a second characteristic of the electrical waveform, said measuring of said second characteristic including:

processing the predetermined number of samples from each interval of the waveform to produce an average value of the second characteristic which is compared to a predetermined threshold therefore; and, determining when the average value of the second measured characteristic exceeds this threshold for a first predetermined period of time, and if the threshold is exceeded, and when the measured value for the second measured characteristic exceeds the second predetermined threshold for a second predetermined period of time, whereby processing the predetermined number of samples of the waveform for each interval to produce the average value of the second characteristic reduces the effect of extraneous events which may temporarily change the value of the measured characteristic; and, at least partially interrupting flow of power to the load during the period of time when the measured value of the second characteristic exceeds the predetermined threshold thereby to reduce the load on the utility.

21. The method of claim 20 in which one of the measured characteristics is the line frequency of the waveform, and the other characteristic is the waveform voltage.

22. The method of claim 21 in which processing of the first and second characteristics of the waveform is performed by respective first and second detectors, and the method further includes converting the waveform, which is a generally sinusoidal waveform, into a different, converted waveform which is supplied as an input to each detector.

23. The method of claim 22 in which the converted waveform comprises a generally square wave and each detector compares a resultant value obtained by sampling the converted waveform against a value representing the predetermined threshold of one of the respective measured characteristics to determine if the threshold for that characteristic has been exceeded.

24. The method of claim 22 in which the converted waveform comprises a generally sawtooth waveform and each detector compares a resultant value obtained by sampling the converted waveform against a value representing the predetermined threshold of one of the respective measured characteristics to determine if the threshold for that characteristic has been exceeded.

25. The method of claim 22 in which the measured voltage characteristic is a function of the peak amplitude of the waveform voltage.

26. The method of claim 22 in which the measured voltage characteristic is a function of the root mean square (rms) amplitude of the waveform voltage.

27. The method of claim 18 in which power to the loads is supplied by a first power line from the utility, and the processed waveform is that of an electrical waveform by which power is transmitted by the utility over a second power line.

28. The DRU of claim 1 in which the average value produced is a sliding average by which, when each calculation of the average value is made, the oldest sample value is dropped from the calculation and the newest sample value is included in it.

29. The method of claim 18 in which the average value produced is a sliding average by which, when each calculation of the average value is made, the oldest sample value is dropped from the calculation and the newest sample value is included in it.

* * * * *